United States Patent
Kiyokami et al.

(10) Patent No.: US 10,738,878 B2
(45) Date of Patent: Aug. 11, 2020

(54) LUBRICATING SYSTEM OF VEHICLE TRANSMISSION DEVICE

(71) Applicant: TOYOTA JIDOSHA KABUSHIKI KAISHA, Toyota-shi, Aichi-ken (JP)

(72) Inventors: Hiroaki Kiyokami, Toyota (JP); Kazuki Iwakura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 200 days.

(21) Appl. No.: 15/989,652

(22) Filed: May 25, 2018

(65) Prior Publication Data

US 2018/0363762 A1    Dec. 20, 2018

(30) Foreign Application Priority Data

Jun. 20, 2017    (JP) ................................ 2017-120905

(51) Int. Cl.
*F16H 57/04*    (2010.01)

(52) U.S. Cl.
CPC ......... *F16H 57/0447* (2013.01); *F16H 57/04* (2013.01); *F16H 57/045* (2013.01); *F16H 57/0441* (2013.01); *F16H 57/0482* (2013.01)

(58) Field of Classification Search
CPC .. F16H 57/0447; F16H 57/04; F16H 57/0441; F16H 57/045; F16H 57/0482; F16H 57/0436; F16H 57/0483; F16H 57/0476; B60K 6/445; F01M 1/02; F01M 11/004; F01M 11/04
USPC ....................................................... 180/339
See application file for complete search history.

(56) References Cited

U.S. PATENT DOCUMENTS

| | | | | |
|---|---|---|---|---|
| 4,736,819 A | * | 4/1988 | Muller | F16H 57/0447 123/196 AB |
| 5,662,188 A | * | 9/1997 | Ito | B62D 5/07 184/11.1 |
| 6,217,758 B1 | * | 4/2001 | Lee | F01M 11/0004 210/167.06 |

(Continued)

FOREIGN PATENT DOCUMENTS

EP    2236778 A1 * 10/2010 ............. F01M 5/005
JP    2003-130189 A    5/2003

(Continued)

OTHER PUBLICATIONS

Translation of EP 2236778 A1 accessed at https://translationportal.epo.org/emtp/translate/?ACTION=description-retrieval&Country=EP&ENGINE=google&FORMAT=docdb&KIND=A1&LOCALE=en_EP&NUMBER=2236778&SRCLANG=de&TRGLANG=en on Jan. 31, 2020. (Year: 2009).*

*Primary Examiner* — Paul N Dickson
*Assistant Examiner* — Hilary L Johns
(74) *Attorney, Agent, or Firm* — Oliff PLC

(57) ABSTRACT

A lubricating system of a vehicle transmission device includes a third oil storage part that is provided above a first oil storage part and a second oil storage part in a vehicle height direction. The third oil storage part stores lubricating oil, and includes a first outlet that allows the lubricating oil to flow out by gravity toward the first oil storage part without passing through the second oil storage part. As the lubricating oil is thus returned from the first outlet to the first oil storage part without passing through the second oil storage part, the oil level in the first oil storage part can be stably maintained with the lubricating oil supplied thereto regardless of the oil level in the second oil storage part.

9 Claims, 7 Drawing Sheets

(56) References Cited

U.S. PATENT DOCUMENTS

| | | | | |
|---|---|---|---|---|
| 6,299,561 | B1* | 10/2001 | Kramer | F16H 57/0447 184/13.1 |
| 10,309,524 | B2* | 6/2019 | Kiyokami | F16H 57/0475 |
| 2002/0053489 | A1* | 5/2002 | Schnitzer | F01M 1/02 184/6.12 |
| 2004/0154846 | A1* | 8/2004 | Kira | B60K 6/405 180/65.6 |
| 2008/0073153 | A1* | 3/2008 | Fujimoto | F01M 1/02 184/6.28 |
| 2009/0057061 | A1* | 3/2009 | Bonning | F16H 57/0436 184/6.12 |
| 2011/0041649 | A1* | 2/2011 | Iwata | F16H 57/0447 74/606 R |
| 2013/0145879 | A1* | 6/2013 | Nakamura | F16H 57/043 74/467 |
| 2014/0262675 | A1* | 9/2014 | Sugiyama | F16H 57/0457 192/85.01 |
| 2015/0323059 | A1* | 11/2015 | Pritchard | F16H 57/05 184/15.1 |
| 2016/0076416 | A1 | 3/2016 | Kodama et al. | |
| 2016/0091080 | A1* | 3/2016 | Craft | F16H 57/0434 184/6.12 |
| 2016/0369853 | A1* | 12/2016 | Sugiura | F01M 1/10 |
| 2017/0219085 | A1* | 8/2017 | Kiyokami | F16H 57/0475 |
| 2017/0350498 | A1* | 12/2017 | Muto | F16H 57/0031 |

FOREIGN PATENT DOCUMENTS

| | | |
|---|---|---|
| JP | 2007-247706 A | 9/2007 |
| JP | 2008-051176 A | 3/2008 |
| JP | 2008-256187 A | 10/2008 |
| JP | 2011-027142 A | 2/2011 |
| JP | 2016-061327 A | 4/2016 |
| JP | 2017-137991 A | 8/2017 |

* cited by examiner

LUBRICATING SYSTEM OF VEHICLE TRANSMISSION DEVICE

CROSS-REFERENCE TO RELATED APPLICATIONS

The disclosure of Japanese Patent Application No. 2017-120905 filed on Jun. 20, 2017 including the specification, drawings and abstract is incorporated herein by reference in its entirety.

BACKGROUND

1. Technical Field

The present disclosure relates to a lubricating system of a vehicle transmission device, and more particularly to a lubricating system of a vehicle transmission device that can stably maintain the level of lubricating oil stored in an oil storage part provided at a bottom of a case.

2. Description of Related Art

A lubricating system of a vehicle transmission device that includes a case, a first oil storage part, a second oil storage part, a first oil pump, and a second oil pump as described below is known. The case is a case in which a gear mechanism of the vehicle transmission device that transmits drive power from a drive power source to drive wheels is contained and at a bottom of which lubricating oil is stored. The first oil storage part and the second oil storage part are storage parts that are provided at the bottom of the case and divided from each other by a partition wall. The first oil pump is a mechanical oil pump that is driven by the vehicle transmission device and suctions the lubricating oil stored in the first oil storage part. The second oil pump is a mechanical or electrical oil pump that suctions the lubricating oil stored in the second oil storage part. For example, such a lubricating system of a vehicle transmission device is described in Japanese Patent Application Publication No. 2011-027142 (JP 2011-027142 A) or Japanese Patent Application Publication No. 2008-051176 (JP 2008-051176 A).

In the lubricating system of a vehicle transmission device described in JP 2011-027142 A, a first oil storage part and a second oil storage part divided from each other by a partition wall are provided at a bottom of a case housing a gear mechanism. Lubricating oil stored in the first oil storage part is suctioned by a first oil pump driven by the vehicle transmission device from a suction port of this first oil pump, and is supplied to the gear mechanism of the vehicle transmission device as well as to the second oil storage part. Lubricating oil overflowing from the second oil storage part is supplied to the first oil storage part. Thus, the level of the lubricating oil stored in the first oil storage part can be lowered, which can reduce resistance to the gear mechanism upon contact with the lubricating oil stored in the first oil storage part when the gear mechanism rotates and scrapes up this lubricating oil. On the other hand, the lubricating system of a vehicle transmission device described in JP 2008-051176 A is provided with a catch tank in place of a second oil storage part, and thereby controls the oil level in a first oil storage part in the same manner as in JP 2011-027142 A.

SUMMARY

However, in the case of a vehicle such as an electric vehicle or a hybrid electric vehicle that supplies lubricating oil stored in a first oil storage part to a gear mechanism and a bearing by a mechanical oil pump and that supplies lubricating oil stored in a second oil storage part to a driving motor by a mechanical or electrical oil pump, the lubricating systems of the above patents that control the oil level in the first oil storage part by supplying the lubricating oil stored in the second oil storage part or the catch tank to the first oil storage part may fail to supply the lubricating oil to the first oil storage part when the oil level in the second oil storage part or the catch tank is low. As a result, the oil level in the first oil storage part may become significantly low, making it impossible to sufficiently lubricate the gear mechanism and the bearing. In other words, in the case of a vehicle equipped with the aforementioned driving motor, the lubricating systems described in JP 2011-027142 A and JP 2008-051176 A have difficulty in stably maintaining the oil level in the first oil storage part so as to avoid a significantly low oil level.

On the other hand, it is conceivable to adjust the amount of lubricating oil stored in the second oil storage part or the catch tank, for example, by adjusting the discharge amount of a discharge oil pump by means of a relief valve or a flow regulation valve. However, it is difficult to design a valve that functions stably under temperature conditions from low temperature to room temperature in a lubricating system that includes a so-called dry sump structure with a pump configuration having a low circuit pressure. A dry sump structure here refers to a structure in which lubricating oil stored in an oil storage part is supplied to parts by a supply oil pump, and the lubricating oil returning after lubricating the parts is returned to the oil storage part by a discharge oil pump.

In view of the above circumstances, the present disclosure provides a lubricating system of a vehicle transmission device that includes a third oil storage part having a first outlet that allows lubricating oil to flow out by gravity toward a first oil storage part without passing through a second oil storage part, and that can thereby stably maintain the oil level in the first oil storage part.

According to an aspect of the present disclosure, there is provided a lubricating system of a vehicle transmission device including a case, a first oil storage part, a second oil storage part, a third oil storage part, a first oil pump, and a second oil pump. The case contains a gear mechanism of the vehicle transmission device, the vehicle transmission device being configured to transmit drive power from a drive power source to a drive wheel, and the case stores lubricating oil at the bottom of the case. The first oil storage part and the second oil storage part are provided at the bottom of the case and divided from each other by a partition wall. The third oil storage part is provided inside the case, above the first oil storage part and the second oil storage part in a vehicle height direction. The first oil pump is a mechanical oil pump configured to be driven by the vehicle transmission device and to suction the lubricating oil stored in the first oil storage part. The second oil pump is a mechanical or electrical oil pump configured to suction the lubricating oil stored in the second oil storage part. The lubricating system is configured such that the first oil pump supplies the suctioned lubricating oil to the gear mechanism as well as to the third oil storage part. The third oil storage part is configured to store the lubricating oil supplied from the first oil pump, and the third oil storage part includes a first outlet that is configured to allow the lubricating oil to flow out by gravity toward the first oil storage part without passing through the second oil storage part.

According to this lubricating system of a vehicle transmission device, the third oil storage part is provided inside the case, above the first oil storage part and the second oil storage part in the vehicle height direction. The first oil pump supplies the suctioned lubricating oil to the gear mechanism as well as to the third oil storage part. The third oil storage part stores the lubricating oil supplied from the first oil pump, and includes the first outlet that allows the lubricating oil to flow out by gravity toward the first oil storage part without passing through the second oil storage part. Accordingly, the lubricating oil stored in the third oil storage part by the first oil pump returns by gravity from the first outlet to the first oil storage part without passing through the second oil storage part. Thus, the oil level in the first oil storage part can be stably maintained as the lubricating oil is supplied to the first oil storage part regardless of the oil level in the second oil storage part.

In the above lubricating system, the drive power source may be an engine, and the second oil pump may be configured to be driven by the engine.

According to this lubricating system, the drive power source is an engine, and the second oil pump is configured to be driven by the engine. Compared with when the drive power source is other than the engine, this lubricating system can eliminate the need for complicated control and thereby achieve a cost reduction.

In the above lubricating system, the second oil pump may be configured to be driven by a pump driving motor.

According to this lubricating system, the second oil pump is driven by the pump driving motor. As the second oil pump can be coupled to the pump driving motor with power transmission from an output unit interrupted, it is possible to discharge from the second oil pump an amount of lubricating oil that does not depend on the vehicle speed, also when the vehicle is stationary.

In the above lubricating system, the second oil pump may be configured to supply the suctioned lubricating oil to a driving motor provided in the vehicle transmission device.

According to this lubricating system, the second oil pump supplies the suctioned lubricating oil to the driving motor provided in the vehicle transmission device. Thus, the lubricating oil can be suctioned and supplied to the driving motor by the second oil pump to cool the driving motor, separately from the lubricating oil suctioned by the first oil pump to lubricate the gear mechanism. In this way, the driving motor can be cooled regardless of the amount of lubricating oil stored in the first oil storage part.

In the above lubricating system, the second oil pump may be configured to supply the lubricating oil suctioned by the second oil pump to the driving motor and then return the lubricating oil to the second oil storage part without passing through the third oil storage part.

According to this lubricating system, the lubricating oil suctioned by the second oil pump is supplied to the driving motor and then returned to the second oil storage part without passing through the third oil storage part. Since the lubricating oil supplied to the driving motor by the second oil pump is thus returned to the second oil storage part without mixing into the lubricating oil in the third oil storage part, the amount of lubricating oil stored in the third oil storage part and the amount of lubricating oil stored in the first oil storage part are highly correlated with each other. Thus, when the oil level in the first oil storage part becomes significantly low, the amount of lubricating oil in the third oil storage part is likely to exceed the predetermined amount, which can further ensure that the oil level in the first oil storage part is stably maintained.

In the above lubricating system, the third oil storage part may be provided by a catch tank that is configured to store lubricating oil scraped up by the gear mechanism as the gear mechanism rotates.

According to this lubricating system, the third oil storage part is formed by the catch tank that stores lubricating oil scraped up by the gear mechanism as it rotates. Since the third oil storage part and the catch tank are thus formed by the same part, this lubricating system includes a reduced number of parts and can thereby achieve a cost reduction.

In the above lubricating system, the third oil storage part may be provided above a maximum oil level in the first oil storage part and the second oil storage part in the vehicle height direction that is above the partition wall in the vehicle height direction.

According to this lubricating system, the third oil storage part is provided above the maximum oil level in the first oil storage part and the second oil storage part in the vehicle height direction, the maximum oil level being above the partition wall in the vehicle height direction. This arrangement can ensure that the lubricating oil stored in the third oil storage part returns by gravity from the first outlet to the first oil storage part without passing through the second oil storage part.

In the above lubricating system, the first outlet may be configured to allow the lubricating oil to flow out by gravity toward the first oil storage part without passing through the second oil storage part when the amount of lubricating oil stored in the third oil storage part exceeds a predetermined amount.

According to this lubricating system, when the amount of lubricating oil stored in the third oil storage part exceeds a predetermined amount, the first outlet allows the lubricating oil to flow out by gravity toward the first oil storage part without passing through the second oil storage part. Thus, the oil level in the first oil storage part can be maintained more stably, as the lubricating oil returns by gravity from the first outlet to the first oil storage part when the amount of lubricating oil stored in the third oil storage part exceeds a predetermined amount, i.e., when the lubricating oil stored in the first oil storage part is excessively supplied to the gear mechanism and the third oil storage part and the oil level in the first oil storage part becomes significantly low.

In the above lubricating system, the third oil storage part may include a second outlet that is configured to allow the lubricating oil to flow out at a lower flow rate than a flow rate at which the lubricating oil is allowed to flow out of the first outlet by gravity toward the first oil storage part when the amount of lubricating oil stored in the third oil storage part is less than or equal to the predetermined amount.

According to this lubricating system, the third oil storage part includes the second outlet that allows the lubricating oil to flow out by gravity toward the first oil storage part when the amount of lubricating oil stored in the third oil storage part is less than or equal to the predetermined amount. This second outlet allows the lubricating oil to flow out at a lower flow rate than a flow rate at which the lubricating oil is allowed to flow out of the first outlet. Thus, the oil level in the first oil storage part can be maintained more stably, as the lubricating oil returns by gravity from the second outlet to the first oil storage part when the amount of lubricating oil stored in the third oil storage part is less than or equal to the predetermined amount, i.e., when the oil level in the first oil storage part is not significantly low.

In the above lubricating system, the third oil storage part may include a second outlet that is configured to allow the lubricating oil to flow out by gravity toward the second oil storage part when the amount of lubricating oil stored in the third oil storage part is less than or equal to the predetermined amount.

According to this lubricating system, the third oil storage part includes the second outlet that allows the lubricating oil to flow out by gravity toward the second oil storage part when the amount of lubricating oil stored in the third oil storage part is less than or equal to the predetermined amount. Thus, the lubricating oil returns by gravity from the second outlet to the second oil storage part when the oil level in the first oil storage part is not significantly low, so that a significant decrease in the oil level in the first oil storage part can be avoided as well as the oil level in the second oil storage part can be stably maintained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
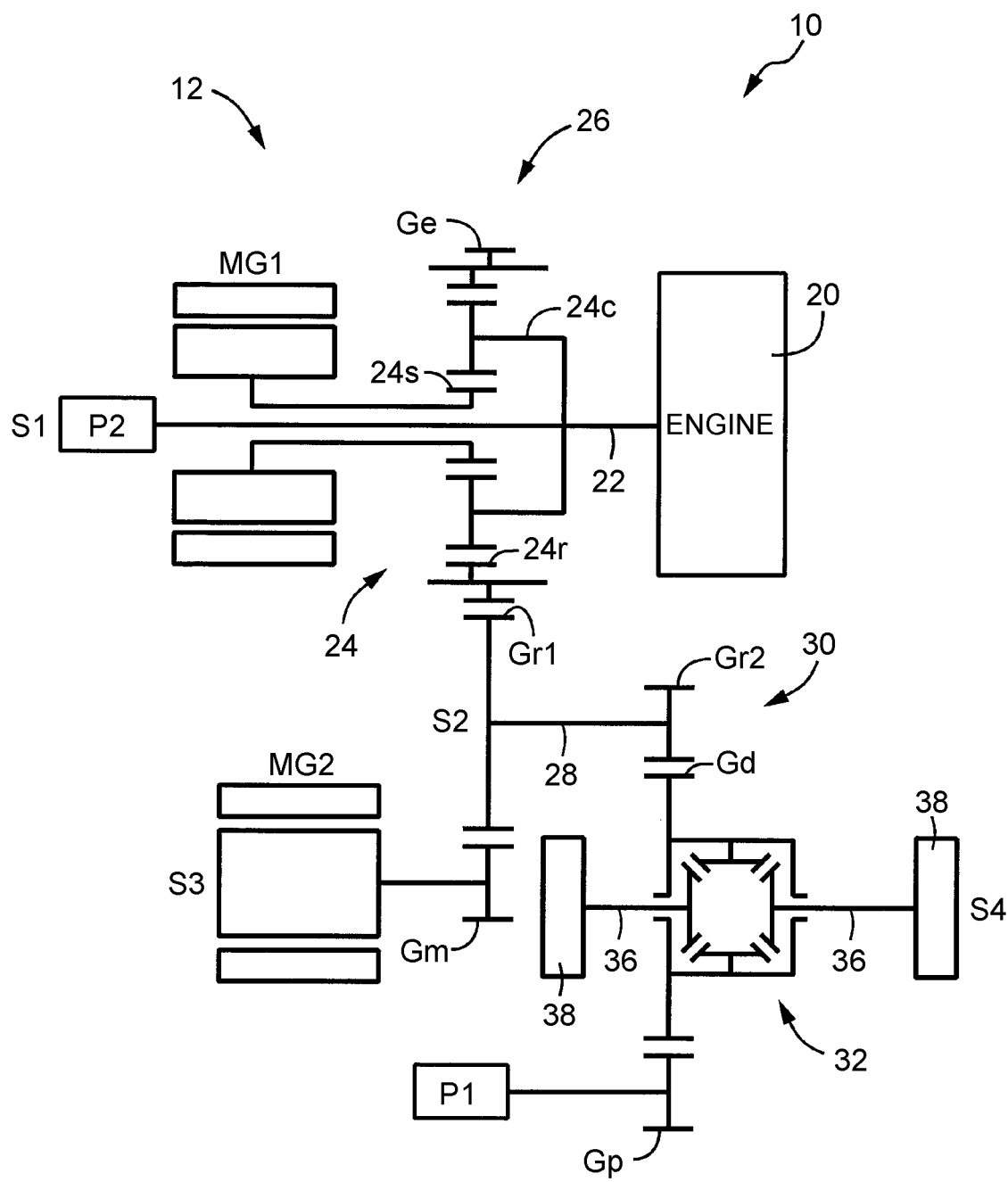
FIG. 1 is a skeleton diagram illustrating a schematic configuration of a vehicle to which a lubricating system of a vehicle transmission device according to each embodiment of the present disclosure is applied.

The present disclosure is suitably applicable, for example, to an engine-driven vehicle and a hybrid electric vehicle that includes a rotating machine for propulsion, i.e., a driving motor, in addition to an engine serving as a drive power source for propulsion, as well as to an electric vehicle that is equipped with only an electric motor as a drive power source. For example, a motor generator that can selectively fulfil the function of an electric motor and that of a power generator is suitably used as the driving motor, but an electric motor can also be used. A horizontal transaxle as in a front-engine, front-wheel-drive (FF) vehicle etc. with a plurality of axes disposed along a vehicle width direction is suitably used as the vehicle transmission device, but this transmission device may instead be that of a front-engine, rear-wheel-drive (FR) vehicle or a four-wheel-drive vehicle. For example, an output unit of the vehicle transmission device is a differential gear set etc. that outputs drive power transmitted thereto from a drive power source through a gear mechanism etc. to right and left drive wheels.

For example, a first supply path that supplies lubricating oil to parts (a gear, bearing, rotating machine, etc.) of the vehicle transmission device is connected to a discharge side of a first oil pump that is mechanically driven to rotate as the output unit of the vehicle transmission device rotates. A second supply path is connected to a discharge side of a second oil pump that is driven to rotate by a rotation drive power source different from the output unit of the vehicle transmission device. When these supply paths are configured to be independent of each other, the function of lubricating the parts of the vehicle transmission device can be shared between the supply paths, and unnecessary lubrication can be avoided by individually setting the suction performance etc. of oil pumps according to the required amount of oil that differs among portions to be supplied with lubricating oil. Moreover, the lubrication performance etc. of each supply path can be appropriately set, for example, by separately providing a heat exchanger, such as an oil cooler, or providing an oil storage that stores lubricating oil. Currents of lubricating oil discharged from the first oil pump and the second oil pump may be merged and supplied to the portions to be lubricated of the parts of the vehicle transmission device through a common supply path.

An oil pump that is mechanically driven to rotate by an engine is suitably used as the second oil pump, but an electrical oil pump that is driven to rotate by a pump driving motor can also be adopted. In this case, it is possible to lubricate the parts with an amount of lubricating oil that does not depend on the vehicle speed, also when the vehicle is stationary, by coupling this oil pump to a drive power source other than the output unit of the vehicle transmission device, with power transmission from the output unit interrupted. An oil storage part may be divided into two parts in a vehicle length direction, or may be divided into three parts in the vehicle length direction. It is also possible to divide the oil storage part in a vehicle width direction. Once the oil level in the oil storage part decreases to or below the level of an upper end of a partition wall, the oil levels in a first oil storage part and a second oil storage part vary independently of each other. Alternatively, a communication hole etc. may be provided in the partition wall so as to allow a flow of lubricating oil between the adjacent oil storage parts. Also in this case, the oil levels vary independently of each other due to flow resistance in the communication hole.

The suction performance of the first oil pump and the second oil pump are appropriately determined. For example, the suction performance of the first oil pump that is driven to rotate when the vehicle is moving is set to be lower than that of the second oil pump. However, the first oil pump and the second oil pump may have equivalent suction performance, or the suction performance of the first oil pump may be higher than that of the second oil pump.

The first oil pump that is mechanically driven to rotate as the output unit of the vehicle transmission device rotates may be configured to be always driven to rotate as the output unit of the vehicle transmission device rotates. Alternatively, the first oil pump can be configured to be driven to rotate by being coupled to the output unit of the vehicle transmission device through a pump on-off device that allows and interrupts power transmission, as well as to another rotation drive power source (pump driving motor etc.). In this case, it is possible to lubricate the parts with an amount of lubricating oil that does not depend on the vehicle speed, also when the vehicle is stationary, by coupling the first oil pump to the other rotation drive power source, with power transmission from the output unit of the vehicle transmission device interrupted.

In the following, embodiments as examples of the present disclosure will be described in detail with reference to the drawings. The drawings in the following embodiments are simplified or deformed as appropriate, and the dimensional ratios, shapes, etc. of parts are not necessarily exactly represented.

Figure 2:
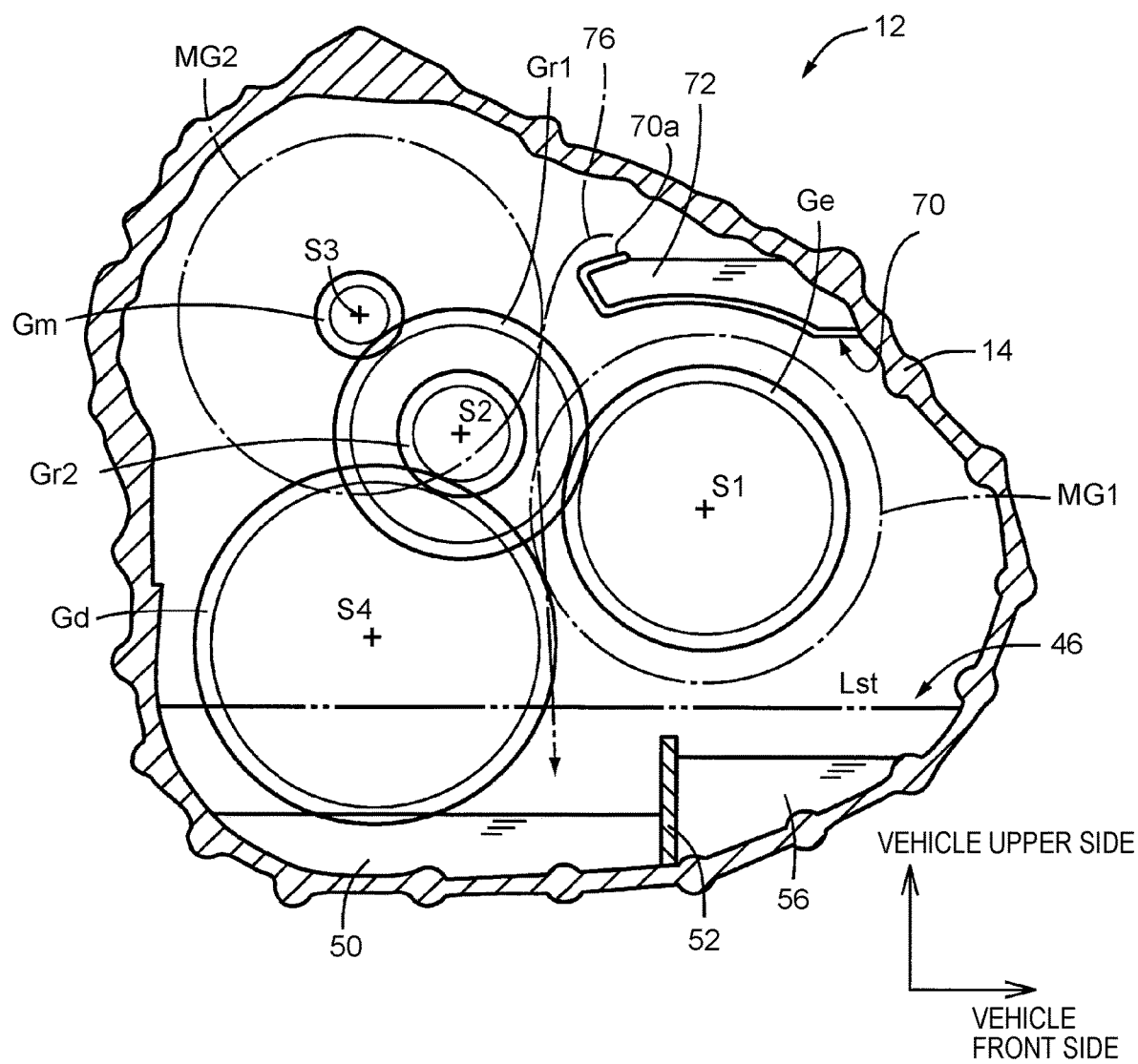
FIG. 2 is a sectional view showing a positional relationship among a plurality of axes provided in the vehicle transmission device shown in FIG. 1.

FIG. 1 is a skeleton diagram illustrating a vehicle transmission device (hereinafter referred to as a transmission device) 12 of a hybrid electric vehicle 10 to which a lubricating system of each embodiment of the present disclosure is applied. Moreover, FIG. 1 is a development view showing the transmission device 12 in a developed state such that a plurality of axes thereof are located in a common plane. FIG. 2 is a sectional view showing the positional relationship among these axes. The transmission device 12 is a horizontal transaxle for a hybrid electric vehicle, such as an FF vehicle, in which the axes are disposed along a vehicle width direction, and is contained inside a case 14 shown in FIG. 2. The case 14 is composed of a plurality of members as necessary.

The transmission device 12 includes a first axis S1 to a fourth axis S4 that are substantially parallel to the vehicle width direction. An input shaft 22 coupled to an engine 20 that is a drive power source is provided on the first axis S1, and a single-pinion planetary gear set 24 and a first motor, i.e., a first motor generator MG1, are disposed concentrically on the first axis S1. The planetary gear set 24 and the first motor generator MG1 function as an electrical differential unit 26. The input shaft 22 is coupled to a carrier 24c of the planetary gear set 24 that is a differential mechanism; the first motor generator MG1 is coupled to a sun gear 24s; and an output gear Ge is provided on a ring gear 24r. The carrier 24c, the sun gear 24s, and the ring gear 24r are a first rotating element, a second rotating element, and a third rotating element, respectively, and the first motor generator MG1 corresponds to a rotating machine for differential control. The first motor generator MG1 is used selectively as an electric motor and a power generator. When the first motor generator MG1 functions as a power generator, the rotation speed of the sun gear 24s is continuously controlled by regenerative control etc., so that the rotation speed of the engine 20 is output from the output gear Ge while being continuously changed. On the other hand, when the torque of the first motor generator MG1 is reduced to zero, the sun gear 24s freewheels and thereby dragging of the engine 20 is prevented. The engine 20 is an internal combustion engine that generates power by combusting fuel.

A speed reducing gear device 30 having a shaft 28 and a large speed reducing gear Gr1 and a small speed reducing gear Gr2 provided respectively at both ends of the shaft 28 is disposed on the second axis S2, and the large speed reducing gear Gr1 is meshed with the output gear Ge. The large speed reducing gear Gr1 is further meshed with a motor output gear Gm of a second motor, i.e., a second motor generator MG2, that is disposed on the third axis S3. The second motor generator MG2 is selectively used as an electric motor and a power generator. Under power running control that causes the second motor generator MG2 to function as an electric motor, the second motor generator MG2 is used as a drive power source for propulsion (driving) of the hybrid electric vehicle 10. The second motor generator MG2 corresponds to a propulsion motor.

The small speed reducing gear Gr2 is meshed with a differential ring gear Gd of a differential gear set 32 disposed on the fourth axis S4, and drive power from the engine 20 and the second motor generator MG2 is distributed to right and left driveshafts 36 through the differential gear set 32 and then transmitted to right and left drive wheels 38. The differential gear set 32 corresponds to an output unit, and the differential ring gear Gd corresponds to an input gear. The planetary gear set 24, the output gear Ge, the large speed reducing gear Gr1, the small speed reducing gear Gr2, the differential ring gear Gd, etc. compose a gear mechanism. As is clear from FIG. 2, the fourth axis S4 is placed at a position on a lowermost side in a vehicle height direction of the first to fourth axes S1 to S4; the second axis S2 and the third axis S3 are placed at positions above the fourth axis S4; and the first axis S1 is placed at a position obliquely above and in front of the fourth axis S4 in the vehicle length direction.

As shown in FIG. 2, a catch tank 70 is provided at an upper part inside the case 14. As shown in FIG. 2, the catch tank 70 is formed so as to be open at an upper side in the vehicle height direction, and for example, lubricating oil that is scraped up by the differential ring gear Gd as it rotates flows into the catch tank 70 through this opening and is stored there. In the first embodiment, a third oil storage part 72 is formed by the catch tank 70. The catch tank 70 is provided above the first motor generator MG1 in the vehicle height direction. The catch tank 70 is provided above the first motor generator MG1 in the vehicle height direction in the first embodiment, but may instead be provided, for example, above the second motor generator MG2 in the vehicle height direction.

Such a hybrid electric vehicle 10 is capable of executing an electric vehicle (EV) travel mode and a hybrid vehicle (HV) travel mode. Specifically, the EV travel mode is a mode in which the vehicle travels using the second motor generator MG2 under power running control as a drive power source, with rotation of the engine 20 stopped, and this mode is selected in a region of low required drive power, i.e., low load. The HV travel mode is a mode in which the vehicle travels using the engine 20 as a drive power source while generating reactive force in the first motor generator MG1 by regenerative control, and this mode is selected in a region of higher required drive power, i.e., higher load, than the EV travel mode. Instead of the HV travel mode or in addition to the HV travel mode, for example, an engine travel mode in which the vehicle always travels using only the engine 20 as a drive power source may be provided.

Figure 3:
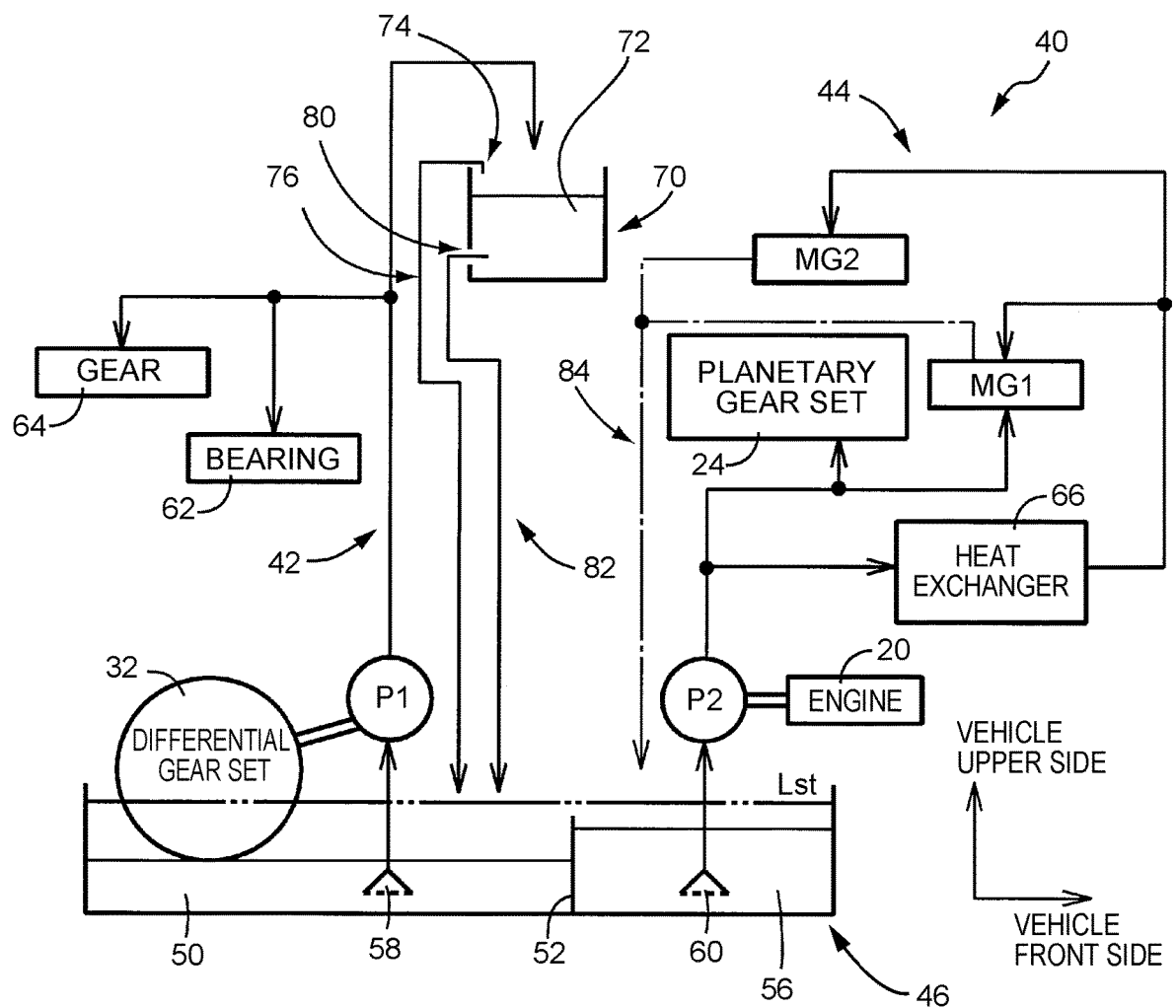
FIG. 3 is a hydraulic circuit diagram illustrating a lubricating system of a vehicle transmission device according to a first embodiment of the present disclosure.
Figure 4:
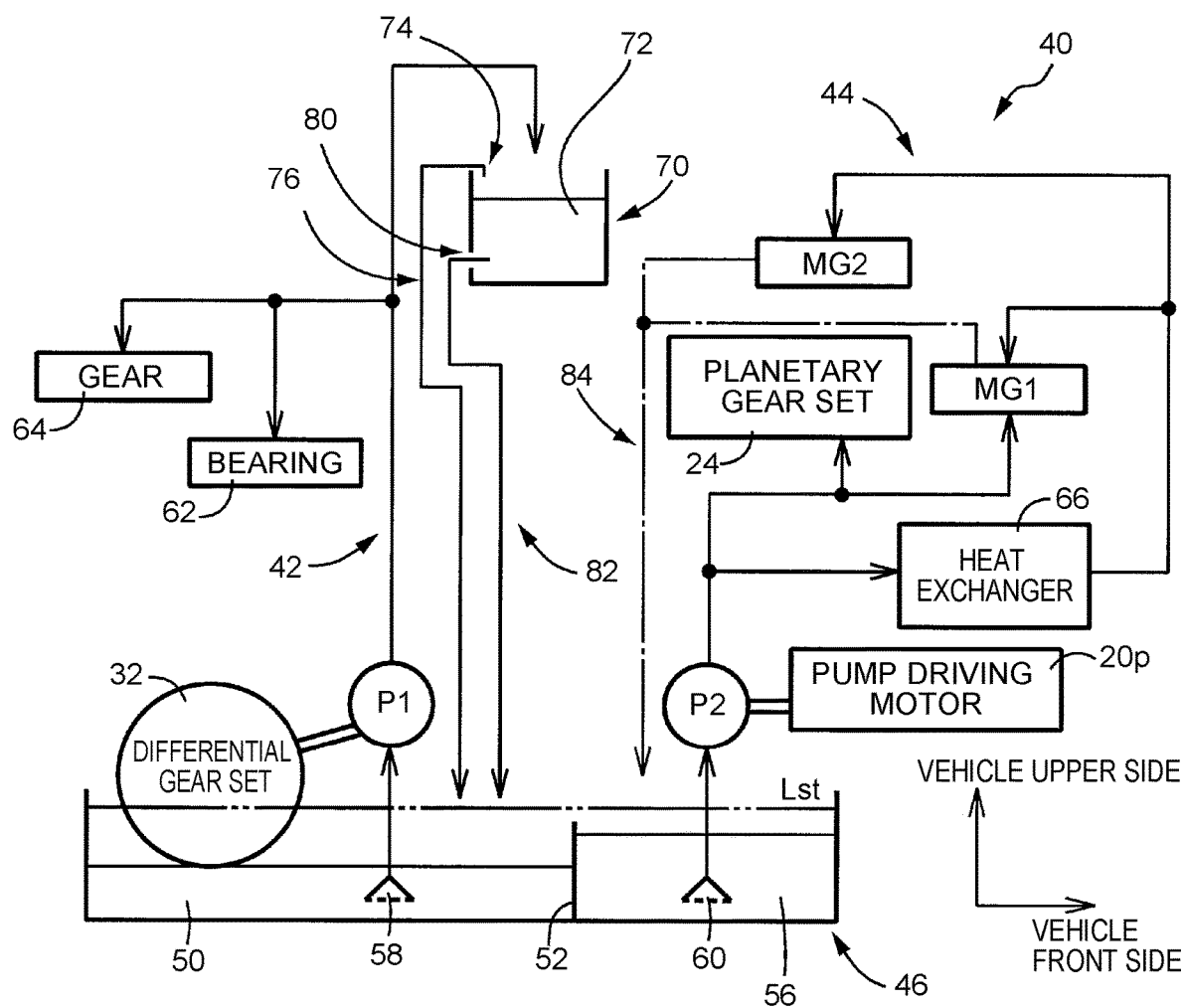
FIG. 4 is a hydraulic circuit diagram of the lubricating system of a vehicle transmission device according to the first embodiment, in which the lubricating system includes a second oil pump that is driven to rotate by a drive power source other than an engine.

FIG. 3 is a hydraulic circuit diagram illustrating a lubricating system 40 provided in the hybrid electric vehicle 10 of the first embodiment. As shown in FIG. 3, the lubricating system 40 includes a first oil pump P1 and a second oil pump P2 as suction devices, which are connected respectively to a first supply path 42 and a second supply path 44 that are different and independent from each other, so as to share the function of lubricating the parts of the transmission device 12. As shown in FIG. 1, the first oil pump P1 is a mechanical oil pump that is mechanically driven to rotate by the output unit (differential gear set 32) through a pump driving gear Gp meshed with the differential ring gear Gd, while the second oil pump P2 is a mechanical oil pump that is coupled to the input shaft 22 and mechanically driven to rotate by the engine 20. It is also possible to configure the first oil pump P1 to be driven to rotate with the pump driving gear Gp meshed with the large speed reducing gear Gr1, the small speed reducing gear Gr2, or the like that rotates in conjunction with the differential ring gear Gd. FIG. 4 is a hydraulic circuit diagram illustrating the lubricating system 40 of the hybrid electric vehicle 10 including the second oil pump P2 that is driven to rotate by a drive power source other than the engine 20. The second oil pump P2 is an oil pump that is driven to rotate by a rotation drive power source other than the differential gear set 32, and that is driven to rotate by the engine 20 in the first embodiment, but as shown in FIG. 4, an electrical oil pump that is driven to rotate by a pump driving electrical motor, i.e., the pump driving motor 20p, may instead be adopted as the second oil pump P2.

The first oil pump P1 and the second oil pump P2 suction lubricating oil from an oil storage part 46 provided at a bottom of the case 14 and output the lubricating oil to the supply paths 42, 44. The oil storage part 46 is formed by the case 14 itself, and includes a first oil storage part 50 and a second oil storage part 56 that are divided from each other by a partition wall 52 and located respectively on a rear side and a front side in the vehicle length direction. The first oil storage part 50 is a part that is located below the differential gear set 32. The second oil storage part 56 is a part that is located below the first axis S1 on which the planetary gear set 24 etc. are disposed. A suction port 58 of the first oil pump P1 is disposed inside the first oil storage part 50, and a suction port 60 of the second oil pump P2 is disposed inside the second oil storage part 56. The suction ports 58, 60 are connected respectively to the oil pumps P1, P2 through suctioned oil paths that are provided independently of each other.

The partition wall 52 functions as a flow restriction part that restricts an equilibrium between the oil levels in the first oil storage part 50 and the second oil storage part 56 while allowing a flow of lubricating oil therebetween. When the vehicle is stopped, both the first oil pump P1 and the second oil pump P2 stop operating, so that lubricating oil having been supplied to the parts of the transmission device 12 flows down back to the oil storage part 46. As a result, as indicated by the two-dot dashed line in FIG. 2 and FIG. 3, a static oil level Lst of the lubricating oil that is the oil level in a static state where the oil level has stopped fluctuating exceeds the partition wall 52, so that the oil levels in the first oil storage part 50 and the second oil storage part 56 become equal to each other. Thus, the static oil level Lst is the maximum oil level in the first oil storage part 50 and the second oil storage part 56. On the other hand, when the vehicle is moving or the first oil pump P1 and the second oil pump P2 are operating, the lubricating oil is supplied to the parts of the transmission device 12 and the amount of lubricating oil inside the oil storage part 46 decreases. Once the oil level in the oil storage part 46 decreases to below the level of an upper end of the partition wall 52, as indicated by the solid lines in FIG. 2 and FIG. 3, the oil levels in the first oil storage part 50 and the second oil storage part 56 vary independently of each other due to the flow restriction imposed by the partition wall 52. Thus, the height dimension of the partition wall 52, the suction performance of the first oil pump P1 and the second oil pump P2, the volume of the oil storage part 46, etc. are determined such that the oil level exceeds the partition wall 52 in the static state, but such that, when the lubricating oil has been supplied to the parts of the transmission device 12, the oil level becomes lower than the position of the upper end of the partition wall 52 despite the lubricating oil returning from the portions to be lubricated. When the oil levels in the first oil storage part 50 and the second oil storage part 56 become significantly low and the suction ports 58, 60 are exposed above the oil surface, air suctioning by the oil pumps may occur, which would make it impossible to sufficiently supply the lubricating oil to the parts of the transmission device 12.

The height position of the partition wall 52, i.e., the position of the upper end thereof, is higher than the position of a lower end of the differential gear set 32, so that, in the static state where the oil level exceeds the partition wall 52, part of the differential gear set 32, specifically part of the differential ring gear Gd is immersed in the lubricating oil. At a start of the vehicle, the lubricating oil is splashed to the parts of the transmission device 12 as the lubricating oil is scraped up by the differential ring gear Gd etc., and thus an appropriately lubricated state can be secured even at a start of the vehicle when it is difficult to supply a sufficient amount of lubricating oil by the first oil pump P1. At a start of the vehicle, the vehicle is normally in the EV travel mode, with rotation of the engine 20 stopped and operation of the second oil pump P2 also stopped.

When the vehicle is moving and the first oil pump P1 and the second oil pump P2 are operating, the oil level decreases to below the position of the upper end of the partition wall 52 as the lubricating oil is scraped up by the differential ring gear Gd etc. that rotate according to the vehicle speed V and as the lubricating oil is suctioned by the first oil pump P1 and the second oil pump P2. The oil level in the first oil storage part 50 is determined by the balance between the amount of lubricating oil scraped up by the differential ring gear Gd etc. plus the amount of lubricating oil suctioned by the first oil pump P1 and the amount of lubricating oil returning to the first oil storage part 50. The oil level in the second oil storage part 56 is determined by the balance between the amount of lubricating oil suctioned by the second oil pump P2 and the amount of lubricating oil returning to the second oil storage part 56. In the first embodiment, the amount of lubricating oil, the volume of the first oil storage part 50, i.e., the position of the partition wall 52, the shape of the partition wall 52, etc. are determined such that the oil level in the first oil storage part 50 preferentially decreases and reaches a level near a lower end of the differential ring gear Gd as indicated by the solid line in FIG. 2 and FIG. 3. When the oil level in the first oil storage part 50 is thus lowered preferentially, resistance to the differential gear set 32 as it rotates and scrapes up the lubricating oil is reduced, so that energy loss is reduced and the fuel efficiency improves. Until reaching a level at or below the position of the upper end of the partition wall 52, this oil level quickly decreases as the lubricating oil is supplied both by the differential ring gear Gd etc. scraping up the lubricating oil and by at least the first oil pump P1 suctioning the lubricating oil. Thus, the energy loss attributable to the resistance to the differential gear set 32 as it rotates and scrapes up the lubricating oil is appropriately reduced.

The first supply path 42 is connected to a discharge side of the first oil pump P1 and supplies lubricating oil to the parts of the transmission device 12. Specifically, the first supply path 42 is configured to supply lubricating oil to a bearing 62 and a gear mechanism 64 (Ge, Gr1, Gr2, Gd, Gm, Gp, etc.) that are parts of the transmission device 12, as well as to the third oil storage part 72. Since the first oil pump P1 is driven to rotate by being coupled to the differential gear set 32, also when the vehicle is in the EV travel mode in which rotation of the engine 20 is stopped, the first oil pump P1 can be driven to rotate to suction the lubricating oil in a suction amount according to the vehicle speed V and supply the lubricating oil to the parts. The differential gear set 32 is lubricated with the lubricating oil scraped up by the differential ring gear Gd etc., but can also be lubricated with the lubricating oil supplied from the first supply path 42. For example, when air suctioning by the first oil pump P1 is likely to occur, an oil storage can be provided as necessary to stably supply the lubricating oil.

The second supply path 44 connected to a discharge side of the second oil pump P2 supplies lubricating oil to the input shaft 22, the planetary gear set 24, and the first motor generator MG1 that are located above the second oil storage part 56, and thereby lubricates and cools these parts. A heat exchanger 66 is provided in the second supply path 44. The heat exchanger 66 cools the lubricating oil to be supplied to the first motor generator MG1 and the second motor generator MG2, whereby these motor generators are cooled and prevented from overheating. For example, the heat exchanger 66 is an oil cooler that cools the lubricating oil through heat exchange by air cooling, water cooling, etc. Since the engine 20 that drives the second oil pump P2 to rotate can be driven also when the vehicle is stationary, it is possible to suction the lubricating oil in a suction amount that does not depend on the vehicle speed V and supply the lubricating oil to portions to be lubricated, also when the vehicle is stationary.

The third oil storage part 72 to which lubricating oil is supplied by the first oil pump P1 is provided above the static oil level Lst in the vehicle height direction that is above the partition wall 52 in the vehicle height direction, and is thus provided above the first oil storage part 50 and the second oil storage part 56 in the vehicle height direction. The third oil storage part 72 includes a first outlet 74 that allows the lubricating oil to flow out by gravity toward the first oil storage part 50 when the amount of lubricating oil stored in the third oil storage part 72 exceeds a predetermined amount. Specifically, the third oil storage part 72 includes the first outlet 74 that opens at the upper side in the vehicle height direction, and when the amount of lubricating oil in the third oil storage part 72 exceeds the predetermined amount, i.e., when the level of the lubricating oil stored in the third oil storage part 72 reaches the first outlet 74 and an overflow state is reached where the lubricating oil overflows from the first outlet 74, the lubricating oil overflowing from the first outlet 74 flows out by gravity toward the first oil storage part 50. The amount of lubricating oil flowing out of the first outlet 74 per unit time, i.e., the flow rate of lubricating oil that can flow out of the first outlet 74, that indicates the momentum with which the lubricating oil flows out is roughly equal to the maximum amount of lubricating oil that can be supplied by the first oil pump P1. The lubricating oil flowing out of the first outlet 74 is returned through a first outflow path 76 to the first oil storage part 50 without passing through the second oil storage part 56. In other words, the lubricating oil flowing out of the first outlet 74 is returned to the first oil storage part 50 without mixing into the lubricating oil in the second oil storage part 56. In the first embodiment, the first outflow path 76 is a path defined by a free fall of the lubricating oil flowing out of the first outlet 74 by gravity. The catch tank 70 forming the third oil storage part 72 includes an inclined surface 70a that is gently inclined such that the lubricating oil flowing out of the first outlet 74 returns to the first oil storage part 50 by gravity, for example, such that the lubricating oil overflowing from the first outlet 74 falls easily and freely. The predetermined amount can be changed, for example, by changing the height position of the first outlet 74.

The third oil storage part 72 includes a second outlet 80 below the first outlet 74 in the vehicle height direction. The second outlet 80 allows the lubricating oil to continuously flow out by gravity toward the first oil storage part 50 without passing through the second oil storage part 56, even when the amount of lubricating oil stored in the third oil storage part 72 is less than or equal to the predetermined amount, i.e., not exceeding the predetermined amount. The amount of lubricating oil flowing out of the second outlet 80 per unit time, i.e., the flow rate of the lubricating oil that can flow out of the second outlet 80, that indicates the momentum with which the lubricating oil flows out is the flow rate of the lubricating oil flowing out of the second outlet 80 when the maximum amount of lubricating oil is stored in the third oil storage part 72. The flow rate of the lubricating oil that can flow out of the second outlet 80 is preset so as to be lower than the flow rate of the lubricating oil that can flow out of the first outlet 74. The lubricating oil flowing out of the second outlet 80 is supplied to the first oil storage part 50 through a second outflow path 82. In the first embodiment, the second outflow path 82 is a path defined by a free fall of the lubricating oil flowing out of the second outlet 80 by gravity.

The oil level in the third oil storage part 72 is determined by the balance between the amount of lubricating oil scraped up by the differential ring gear Gd etc. plus the amount of lubricating oil supplied from the first oil pump P1 and the flow rate of the lubricating oil flowing out of the first outlet 74 and the second outlet 80. Accordingly, when the amount of lubricating oil stored in the third oil storage part 72 increases, the amount of lubricating oil stored in the first oil storage part 50 decreases, and when the amount of lubricating oil stored in the third oil storage part 72 decreases, the amount of lubricating oil stored in the first oil storage part 50 increases. Thus, the amount of lubricating oil stored in the third oil storage part 72 and the amount of lubricating oil stored in the first oil storage part 50 are correlated with each other: when the oil level in the third oil storage part 72 rises, the oil level in the first oil storage part 50 falls, and when the oil level in the third oil storage part 72 falls, the oil level in the first oil storage part 50 rises.

As has been described above, according to the first embodiment, the lubricating system 40 of the vehicle transmission device 12 includes the third oil storage part 72 that is provided inside the case 14, above the first oil storage part 50 and the second oil storage part 56 in the vehicle height direction. The first oil pump P1 supplies the suctioned lubricating oil to the gear mechanism 64 as well as to the third oil storage part 72. The third oil storage part 72 stores the lubricating oil supplied from the first oil pump P1, and includes the first outlet 74 that allows the lubricating oil to flow out by gravity toward the first oil storage part 50 without passing through the second oil storage part 56. Thus, the lubricating oil stored in the third oil storage part 72 by the first oil pump P1 is returned from the first outlet 74 to the first oil storage part 50 without passing through the second oil storage part 56. Since the lubricating oil is supplied to the first oil storage part 50 regardless of the oil level in the second oil storage part 56, the oil level in the first oil storage part 50 can be stably maintained. Moreover, the lubricating oil stored in the third oil storage part 72 returns by gravity from the first outlet 74 to the first oil storage part 50 without passing through the second oil storage part 56, which can eliminate the need for separately providing an oil pump and thereby simplify the structure of the lubricating system.

According to the first embodiment, the drive power source is the engine 20, and the second oil pump P2 is driven to rotate by the engine 20. Compared with when the drive power source is other than the engine 20, this lubricating system can eliminate the need for complicated control and thereby achieve a cost reduction.

According to the first embodiment, the second oil pump P2 supplies the suctioned lubricating oil to the driving motor, i.e., the first motor generator MG1, that is provided in the transmission device 12. Thus, the lubricating oil can be suctioned and supplied to the first motor generator MG1 by the second oil pump P2 to cool the first motor generator MG1, separately from the lubricating oil suctioned by the first oil pump P1 to lubricate the gear mechanism 64. In this way, the first motor generator MG1 can be cooled regardless of the amount of lubricating oil stored in the first oil storage part 50.

According to the first embodiment, the third oil storage part 72 is formed by the catch tank 70 that stores the lubricating oil scraped up by the gear mechanism 64 as it rotates. Since the third oil storage part 72 and the catch tank 70 are thus formed by the same part, the lubricating system 40 of the transmission device 12 includes a reduced number of parts and can thereby achieve a cost reduction.

According to the first embodiment, the third oil storage part 72 is provided above the static oil level in the vehicle height direction that is the level of the lubricating oil in the static state where the lubricating oil has stopped flowing, i.e., the maximum oil level in the first oil storage part 50 and the second oil storage part 56 that is above the partition wall 52 in the vehicle height direction. This arrangement can ensure that the lubricating oil stored in the third oil storage part 72 returns by gravity from the first outlet 74 to the first oil storage part 50 without passing through the second oil storage part 56.

According to the first embodiment, when the amount of lubricating oil stored in the third oil storage part 72 exceeds the predetermined amount, the first outlet 74 allows the lubricating oil to flow out by gravity toward the first oil storage part 50 without passing through the second oil storage part 56. Thus, the oil level in the first oil storage part 50 can be maintained more stably, as the lubricating oil returns by gravity from the first outlet 74 to the first oil storage part 50 when the amount of lubricating oil stored in the third oil storage part 72 exceeds the predetermined amount, i.e., when the lubricating oil stored in the first oil storage part 50 is rapidly supplied to the gear mechanism 64 and the third oil storage part 72 and the oil level in the first oil storage part 50 becomes significantly low.

According to the first embodiment, the third oil storage part 72 includes the second outlet 80 that allows the lubricating oil to flow out by gravity toward the first oil storage part 50 when the amount of lubricating oil stored in the third oil storage part 72 is less than or equal to the predetermined amount. The second outlet 80 allows the lubricating oil to flow out at a lower flow rate than a flow rate at which the lubricating oil is allowed to flow out of the first outlet 74. Thus, the oil level in the first oil storage part 50 can be maintained more stably, as the lubricating oil is returned from the second outlet 80 to the first oil storage part 50 when the amount of lubricating oil stored in the third oil storage part 72 is less than or equal to the predetermined amount, i.e., when the oil level in the first oil storage part 50 is not significantly low.

According to the first embodiment, the lubricating oil suctioned by the second oil pump P2 is supplied to the driving motor, i.e., the first motor generator MG1, and then returned through a return oil path 84 to the second oil storage part 56 without passing through the third oil storage part 72. The lubricating oil suctioned by the second oil pump P2 is supplied to the second motor generator MG2 and then returned through the return oil path 84 to the second oil storage part 56 without passing through the third oil storage part 72. Since the lubricating oil supplied to the first motor generator MG1 by the second oil pump P2 is thus returned to the second oil storage part 56 without mixing into the lubricating oil in the third oil storage part 72, the amount of lubricating oil stored in the third oil storage part 72 and the amount of lubricating oil stored in the first oil storage part 50 are highly correlated with each other. Thus, the oil level in the first oil storage part 50 can be maintained more stably, as the predetermined amount of lubricating oil in the third oil storage part 72 is likely to be exceeded when the oil level in the first oil storage part 50 becomes significantly low.

Next, a second embodiment of the present disclosure will be described. Those parts that are the same as in the above first embodiment will be denoted by the same reference signs while description thereof will be omitted.

Figure 5:
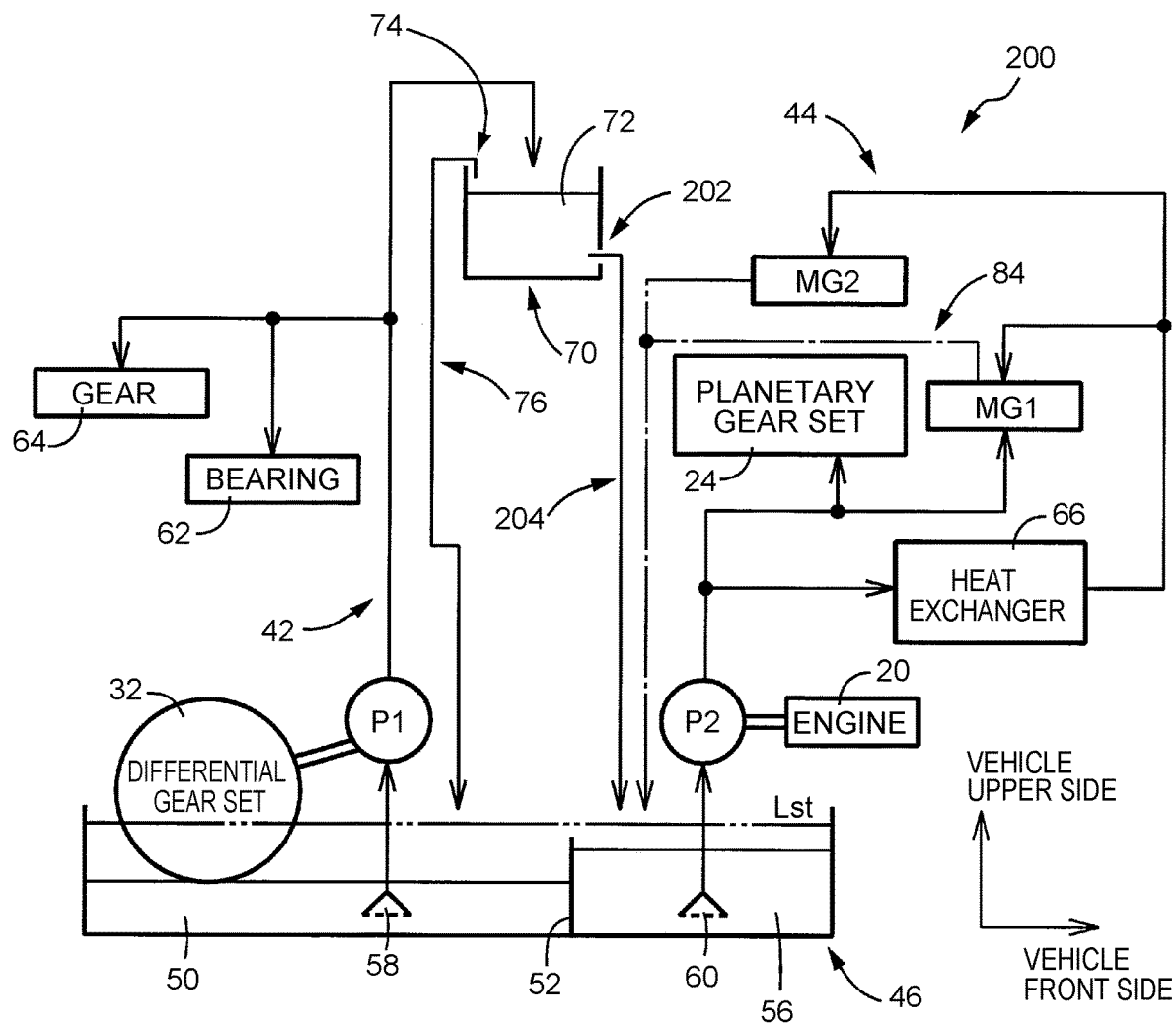
FIG. 5 is a hydraulic circuit diagram illustrating a lubricating system of a vehicle transmission device according to a second embodiment of the present disclosure.

FIG. 5 is a hydraulic circuit diagram illustrating a lubricating system 200 of the vehicle transmission device 12 in the second embodiment of the present disclosure. As shown in FIG. 5, the third oil storage part 72 includes a second outlet 202 that allows the lubricating oil to flow out by gravity, below the first outlet 74 in the vehicle height direction. The lubricating oil flowing out of the second outlet 202 is returned to the second oil storage part 56 through a second outflow path 204. In the second embodiment, the second outflow path 204 is a path defined by a free fall of the lubricating oil flowing out of the second outlet 202 by gravity. The second outlet 202 allows the lubricating oil to flow out to the second oil storage part 56 when the amount of lubricating oil stored in the third oil storage part 72 is less than or equal to the predetermined amount, i.e., not exceeding the predetermined amount. Specifically, the second outlet 202 allows the lubricating oil to continuously flow out to the second oil storage part 56 so as to fall freely by gravity, even when the oil level in the first oil storage part 50 is not significantly low and the amount of lubricating oil stored in the third oil storage part 72 is small.

Thus, according to the second embodiment, the lubricating oil is returned from the second outlet 202 to the second oil storage part 56 even when the amount of lubricating oil stored in the third oil storage part 72 is small. Since the lubricating oil is returned from the second outlet 202 to the second oil storage part 56 even when the oil level in the first oil storage part 50 is not significantly low, a significant decrease in the oil level in the first oil storage part 50 can be avoided as well as the oil level in the second oil storage part 56 can be stably maintained.

Figure 6:
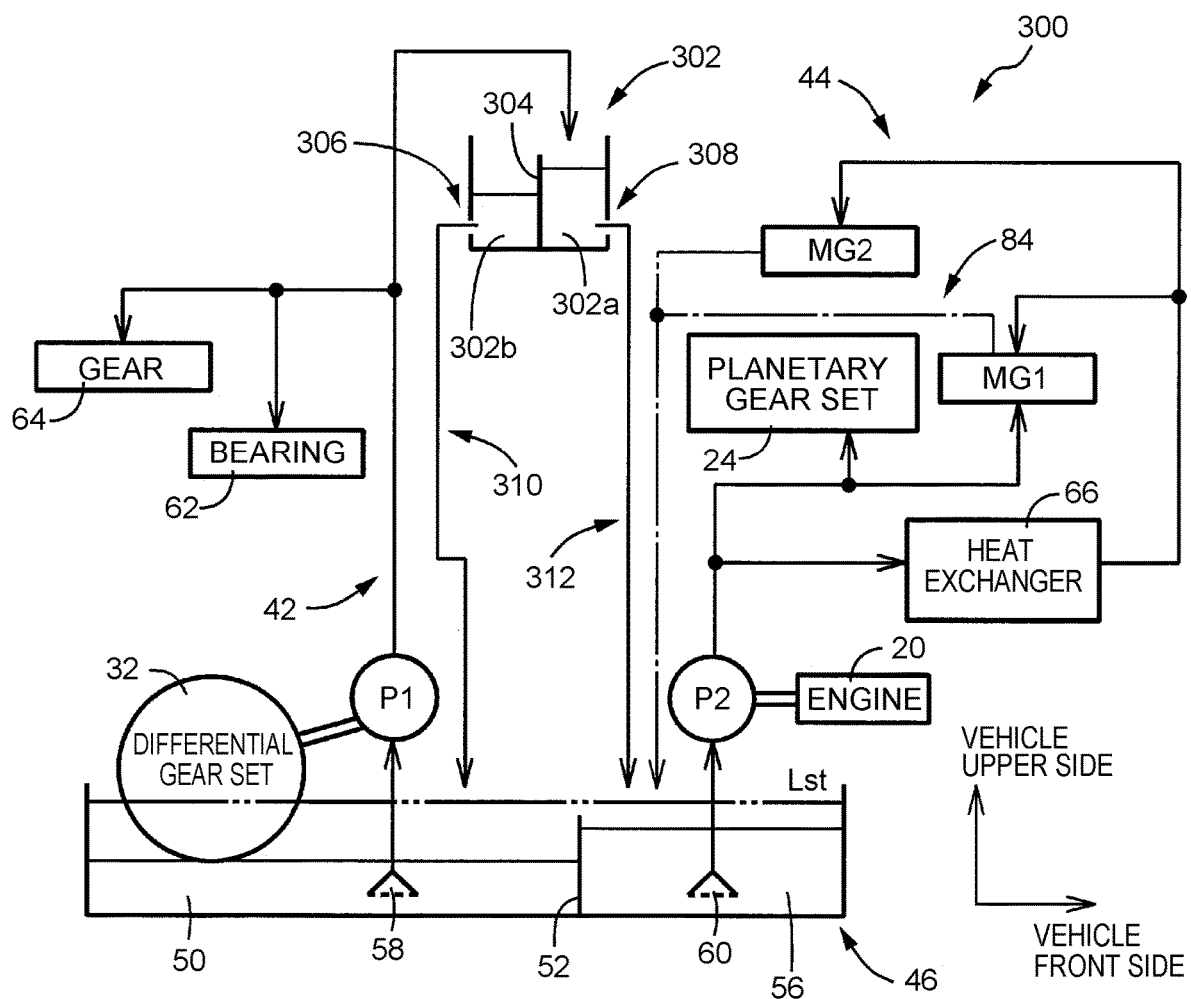
FIG. 6 is a hydraulic circuit diagram illustrating a lubricating system of a vehicle transmission device according to a third embodiment of the present disclosure.

FIG. 6 is a hydraulic circuit diagram illustrating a lubricating system 300 of the vehicle transmission device 12 in a third embodiment of the present disclosure. As shown in FIG. 6, the lubricating system 300 of the third embodiment includes a third oil storage part 302. The third oil storage part 302 is divided by a partition wall 304 in the vehicle length direction, into a vehicle front-side storage part 302a and a vehicle rear-side storage part 302b. The partition wall 304 is formed so as to be shorter than the maximum oil level in the third oil storage part 302, i.e., the oil level indicating the amount of lubricating oil that can be stored in the third oil storage part 302. The partition wall 304 restricts an equilibrium between the oil levels in the vehicle front-side storage part 302a and the vehicle rear-side storage part 302b while allowing a flow of lubricating oil therebetween.

The first oil pump P1 suctions the lubricating oil stored in the first oil storage part 50 and supplies the lubricating oil to the vehicle front-side storage part 302a through the first supply path 42. When the oil level in the vehicle front-side storage part 302a exceeds the partition wall 304, the lubricating oil flows from the vehicle front-side storage part 302a to the vehicle rear-side storage part 302b. Thus, the oil levels in the vehicle front-side storage part 302a and the vehicle rear-side storage part 302b vary independently of each other as indicated by the solid lines in FIG. 6. The third oil storage part 302 includes a first outlet 306 and a second outlet 308. The first outlet 306 is formed in the vehicle rear-side storage part 302b, and allows the lubricating oil to continuously flow out by gravity toward the first oil storage part 50. The second outlet 308 is formed in the vehicle front-side storage part 302a, and allows the lubricating oil to continuously flow out by gravity toward the second oil storage part 56. The first outlet 306 and the second outlet 308 are formed at a lower side of the third oil storage part 302 in the vehicle height direction, at levels substantially equal to each other. The lubricating oil flowing out of the first outlet 306 is returned to the first oil storage part 50 through a first outflow path 310 without passing through the second oil storage part 56. The lubricating oil flowing out of the second outlet 308 is returned to the second oil storage part 56 through a second outflow path 312 without passing through the first oil storage part 50.

Thus, according to the third embodiment, the third oil storage part 302 is divided by the partition wall 304 into the vehicle front-side storage part 302a and the vehicle rear-side storage part 302b, and the lubricating oil is supplied to the vehicle front-side storage part 302a by the first oil pump P1. Moreover, the partition wall 304 restricts an equilibrium between the oil levels in the vehicle front-side storage part 302a and the vehicle rear-side storage part 302b while allowing a flow of lubricating oil therebetween. Thus, when the lubricating oil is controlled so as to flow out of one or both of the first outlet 306 and the second outlet 308 based on the amount of lubricating oil stored in the third oil storage part 302, i.e., the level of the lubricating oil therein, there are fewer design restrictions in that it is not necessary to provide the first outlet 306 above the second outlet 308 in the vehicle height direction, so that, for example, the first outlet 306 and the second outlet 308 can be provided at substantially the same level.

In the third embodiment, the third oil storage part 302 is divided by the partition wall 304 into parts on the front side and the rear side in the vehicle length direction. However, for example, the third oil storage part 302 can also be divided by the partition wall 304 in the vehicle width direction.

Figure 7:
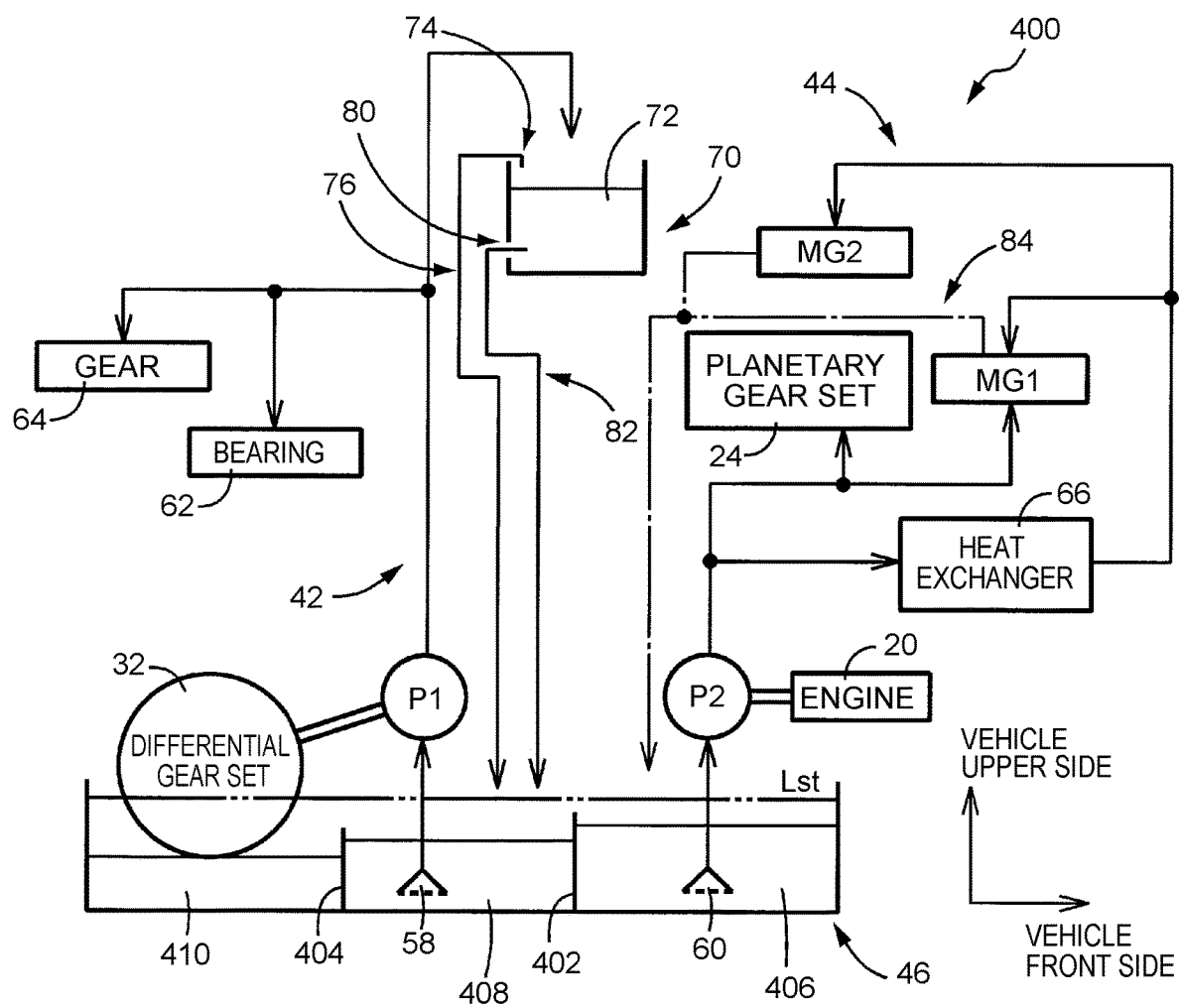
FIG. 7 is a hydraulic circuit diagram illustrating a lubricating system of a vehicle transmission device according to a fourth embodiment of the present disclosure.

FIG. 7 is a hydraulic circuit diagram illustrating a lubricating system 400 of the vehicle transmission device 12 in a fourth embodiment of the present disclosure. As shown in FIG. 7, the oil storage part 46 is divided by a first partition wall 402 and a second partition wall 404 into a second oil storage part 406, a vehicle front-side first oil storage part 408, and a vehicle rear-side first oil storage part 410, in this order from the front side in the vehicle length direction. The suction port 58 of the first oil pump P1 is disposed in the vehicle front-side first oil storage part 408, and the suction port 60 of the second oil pump P2 is disposed in the second oil storage part 406.

When the vehicle is stopped, both the first oil pump P1 and the second oil pump P2 stop operating, so that the lubricating oil having been supplied to the parts of the transmission device 12 flows down back to the oil storage part 46. As a result, as indicated by the two-dot dashed line in FIG. 7, the static oil level Lst of the lubricating oil in the static state where the oil level has stopped fluctuating exceeds the first partition wall 402 and the second partition wall 404, so that the oil levels in the second oil storage part 406, the vehicle front-side first oil storage part 408, and the vehicle rear-side first oil storage part 410 become equal to one another. Thus, the static oil level Lst is the maximum oil level in the second oil storage part 406, the vehicle front-side first oil storage part 408, and the vehicle rear-side first oil storage part 410. In the static state where the oil level exceeds the first partition wall 402 and the second partition wall 404, part of the differential gear set 32, specifically part of the differential ring gear Gd is immersed in the lubricating oil in the vehicle rear-side first oil storage part 410.

At a start of the vehicle or when the vehicle is moving, the lubricating oil stored in the vehicle rear-side first oil storage part 410 is splashed to the parts of the gear mechanism 64 inside the case 14 as this lubricating oil is scraped up by the differential ring gear Gd etc. of the differential gear set 32. When the first oil pump P1 and the second oil pump P2 are operating, including when the vehicle is moving, the lubricating oil stored in the vehicle rear-side first oil storage part 410 is scraped up by the differential ring gear Gd etc., while the lubricating oil stored in the vehicle front-side first oil storage part 408 is suctioned by the first oil pump P1 and the lubricating oil stored in the second oil storage part 406 is suctioned by the second oil pump P2.

The first supply path 42 is connected to the discharge side of the first oil pump P1 and supplies the lubricating oil to the parts of the transmission device 12. Specifically, the first supply path 42 is configured to supply the lubricating oil to the bearing 62 and the gear mechanism 64 (Ge, Gr1, Gr2, Gd, Gm, Gp, etc.) that are the parts of the transmission device 12, as well as to the third oil storage part 72. The second supply path 44 connected to the discharge side of the second oil pump P2 supplies the lubricating oil to the input shaft 22, the planetary gear set 24, and the first motor generator MG1 located above the second oil storage part 406, and thereby lubricates and cools these parts.

The third oil storage part 72 includes the first outlet 74 at an upper side in the vehicle height direction and the second outlet 80 below the first outlet 74 in the vehicle height direction. The first outlet 74 and the second outlet 80 allow the lubricating oil stored in the third oil storage part 72 to flow out by gravity toward the vehicle front-side first oil storage part 408, respectively through the first outflow path 76 and the second outflow path 82. The lubricating oil flowing out of the first outlet 74 and the second outlet 80 is returned to the vehicle front-side first oil storage part 408 without passing through the second oil storage part 406.

Thus, according to the fourth embodiment, the oil storage part 46 is divided by the first partition wall 402 and the second partition wall 404 into the second oil storage part 406, the vehicle front-side first oil storage part 408, and the vehicle rear-side first oil storage part 410. It is possible to set the oil levels in the vehicle front-side first oil storage part 408 and the second oil storage part 406 in which the suction ports 58, 60 are respectively disposed to be higher than the oil level in the vehicle rear-side first oil storage part 410, by appropriately determining the positions and shapes of the first partition wall 402 and the second partition wall 404 or the suction performance etc. of the oil pumps P1, P2. Thus, air suctioning by the oil pumps P1, P2 due to the suction ports 58, 60 being exposed above the oil surface can be avoided, and the lubricating oil can be appropriately suctioned and stably supplied. When the oil storage part 46 is thus divided by the second partition wall 404, it is possible to reduce the resistance to the differential gear set 32 as it rotates and scrapes up the lubricating oil and reduce the energy loss, by preferentially lowering the oil level in the vehicle rear-side first oil storage part 410 in which the differential gear set 32 is disposed, while securing the required sufficient amount of lubricating oil on the side of the second oil storage part 406 and the vehicle front-side first oil storage part 408.

In the fourth embodiment, the suction port 58 is disposed in the vehicle front-side first oil storage part 408, but the suction port 58 can also be disposed in the vehicle rear-side first oil storage part 410, for example. In the fourth embodiment, the lubricating oil flowing out of the second outlet 80 is returned to the vehicle front-side first oil storage part 408, but the oil storage part to which this lubricating oil is returned is not necessarily limited thereto and may instead be the second oil storage part 406, for example. The third oil storage part 72 may be divided by a partition wall, for example, into a vehicle front-side part and a vehicle rear-side part, or may be divided in the vehicle width direction.

While embodiments of the present disclosure have been described in detail based on the drawings, those described above are merely examples. The present disclosure can also be implemented in other forms, which are not particularly illustrated herein, with various modifications and improvements made to those embodiments based on the knowledge of persons skilled in the art within the scope of the gist of the disclosure.

What is claimed is:

1. A lubricating system of a vehicle transmission device, the lubricating system comprising:
    a case in which a gear mechanism of the vehicle transmission device is contained, the vehicle transmission device being configured to transmit drive power from a drive power source to a drive wheel, and lubricating oil is stored at a bottom of the case;
    a first oil storage part and a second oil storage part that are provided at the bottom of the case and divided from each other by a partition wall;
    a third oil storage part that is provided inside the case, above the first oil storage part and the second oil storage part in a vehicle height direction;
    a mechanical first oil pump that is configured to be driven by the vehicle transmission device and to suction the lubricating oil stored in the first oil storage part; and
    a mechanical or electrical second oil pump that is configured to suction the lubricating oil stored in the second oil storage part, wherein
    the first oil pump is configured to supply the suctioned lubricating oil to the gear mechanism as well as to the third oil storage part, and
    the third oil storage part is configured to store the lubricating oil supplied from the first oil pump, and the third oil storage part includes a first outlet that is configured to allow the lubricating oil to flow out by gravity toward the first oil storage part without passing through the second oil storage part when an amount of lubricating oil stored in the third oil storage part exceeds a predetermined amount.

2. The lubricating system according to claim 1, wherein the drive power source is an engine, and the second oil pump is configured to be driven by the engine.

3. The lubricating system according to claim 1, wherein the second oil pump is configured to be driven by a pump driving motor.

4. The lubricating system according to claim 1, wherein the second oil pump is configured to supply the suctioned lubricating oil to a driving motor provided in the vehicle transmission device.

5. The lubricating system according to claim 4, wherein the second oil pump is configured to supply the lubricating oil suctioned by the second oil pump to the driving motor and then return the lubricating oil to the second oil storage part without passing through the third oil storage part.

6. The lubricating system according to claim 1, wherein the third oil storage part is provided by a catch tank that is configured to store lubricating oil scraped up by the gear mechanism as the gear mechanism rotates.

7. The lubricating system according to claim 1, wherein the third oil storage part is provided above a maximum oil level in the first oil storage part and the second oil storage part in the vehicle height direction, the maximum oil level being above the partition wall in the vehicle height direction.

8. The lubricating system according to claim 1, wherein the third oil storage part includes a second outlet that is configured to allow the lubricating oil to flow out at a lower flow rate than a flow rate at which the lubricating oil is allowed to flow out of the first outlet by gravity toward the first oil storage part when the amount of lubricating oil stored in the third oil storage part is less than or equal to the predetermined amount.

9. The lubricating system according to claim 1, wherein the third oil storage part includes a second outlet that is configured to allow the lubricating oil to flow out by gravity toward the second oil storage part when the amount of lubricating oil stored in the third oil storage part is less than or equal to the predetermined amount.

\* \* \* \* \*